Jan. 27, 1953  A. W. BURKS  2,626,842
LOAD EQUALIZING DEVICE FOR THRUST BEARINGS
Filed July 6, 1950
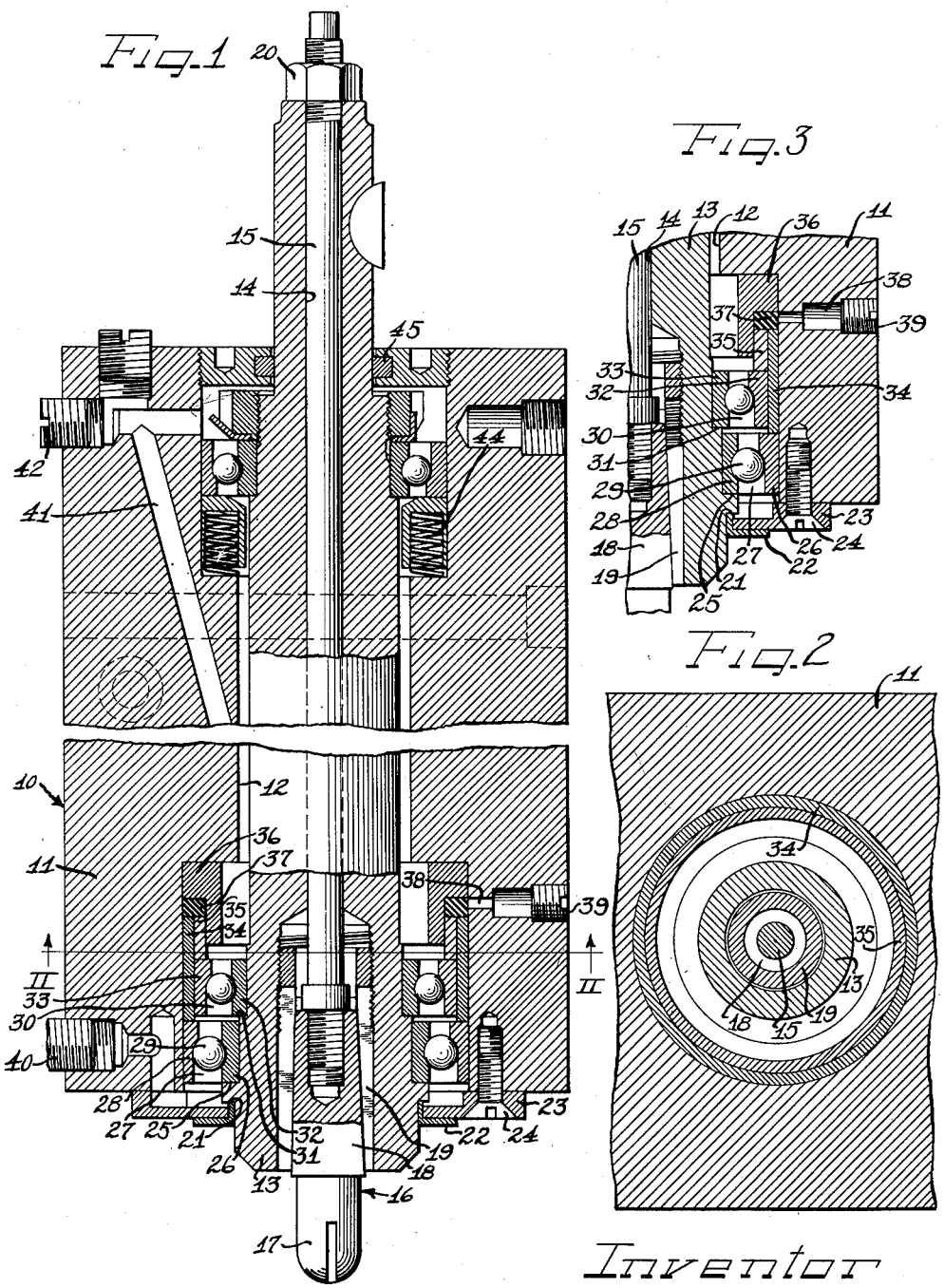
Inventor
Arthur W. Burks Patented Jan. 27, 1953

2,626,842

UNITED STATES PATENT OFFICE 2,626,842

LOAD EQUALIZING DEVICE FOR THRUST BEARINGS

Arthur W. Burks, Decatur, Ill., assignor to Decatur Pump Company, Decatur, Ill., a corporation of Illinois Application July 6, 1950, Serial No. 172,234

2 Claims. (Cl. 308—219)

The present invention relates to a load equalizing device for thrust bearings, and more particularly to means for individually apportioning the total thrust load imposed on a plurality of bearings.

In various environments, as in machine tools and the like, the thrust load imposed on a rotary member is transmitted to a stationary housing or the like through a plurality of thrust bearings. One thrust race of each bearing is secured to the relatively movable member and the other race of the bearing is fixed with respect to the relatively fixed member. The load imposed upon any one of the thrust bearing races should be predetermined in order to insure the provision of a suitable type and size bearing for the load which it must bear. However, the determination of the thrust load on a given bearing under these circumstances is extremely difficult due to the many factors of design and to the varying nature of the load imposed on the rotary member, and to many other factors involved in the specific installation.

The present invention now provides improved means for individually apportioning the thrust load upon a plurality of bearings so that a predetermined portion of the total thrust load will be imposed on each bearing. The present invention, thus contemplates, in effect, the provision of a coupling between the bearings for accommodating the predetermined division of thrust loads between a plurality of bearings. In this manner, the thrust load which is to be imposed upon a given bearing may be determined prior to bearing installation, thereby preventing the failure of the bearing under load and obviating the necessity of carrying out the extremely complicated calculations heretofore necessary.

The means of the present invention are particularly adapted for employment in machine tools, such as routers and the like. The particular means of the present invention suitably include a generally cylindrical thrust collar confined between the stationary thrust race of a bearing and a stationary housing which journals the relatively rotatable member.

More particularly, the collar is in surface contact with a resiliently deformable, non-compressible reactance member confined within the fixed housing for the rotary member. To apportion the load between the plurality of thrust bearings, each of the bearings is provided with a similar collar and each of the collars independently of the other, contacts a single reactance member, so that the total thrust load on the rotary member is exerted on the reactance member through the medium of the collars. The total force transmitted to reactance member by any collar is directly proportional to the contacting surface area of the collar in comparison with the total contacting area of all the collars. Thus, the portion of the thrust load to be transmitted to the housing through each of the bearings is dependent upon and directly proportional to the area of the collar of that bearing which contacts the reactance member.

It is, therefore, an important object of the present invention to provide an improved thrust load equalizing device for a plurality of thrust bearings, the device serving to apportion between a plurality of bearings the total thrust load imposed thereon.

Another important object of the present invention is to provide an improved load equalizing device for a plurality of thrust bearings including the resilient reactance member capable of flowing under load and means for transmitting from the bearings to the reactance member that portion of the load imposed on the bearings.

Another important object of the present invention is to provide a load equalizing device for a plurality of thrust bearings including a flowable reactance member confined within a stationary housing and means connecting each of the bearings with the reactance member for transmitting from the bearings to the reactance member that load imposed on the bearing, said reactance member serving by a fluid flow to apportion the total load on the bearing between the individual bearings.

Still another important object of the present invention is to provide means for apportioning the total thrust load between a plurality of concentric thrust bearings, the means including cylindrical thrust collars for each of the bearings, and a reactance member in surface contact with the collars, the reactance member being capable of flow under pressure to apportion the total load between the bearings.

Other and further important objects of this invention will be apparent from the disclosures in the specification and the accompanying drawings.

On the drawings:

Figure 1 is a broken longitudinal axial sectional view, with parts in elevation, of the router spindle provided with a load equalizing device of the present invention;

Figure 2 is a fragmentary sectional view taken along the plane II—II of Figure 1; and Figure 3 is fragmentary sectional view, similar to Figure 1 and illustrating a modified form of the device of the present invention.

As shown on the drawings:

In Figure 1, reference numeral 10 refers generally to a machine tool router, including a housing 11 having an axial bore 12. A router spindle 13 is mounted in the bore 12 to extend axially therethrough.

The spindle 13 is rotatably journalled in the bore 12 by suitable means, to be hereinafter more fully described. The spindle 13 is axially bored as at 14 to receive therethrough an elongated tie bolt 15. A tool 16 is provided with a head 17 projecting beyond the spindle 13 and with a rearwardly facing generally frusto-conical end portion 18 seated in a correspondingly axially apertured collar or chuck 19. The tool head 16 is retained in the chuck 19 by means of the tie bolt 15, which is threaded into the tool and is retained in the spindle by means of nuts 20 threaded against the other end of the spindle from that receiving the tool 16.

At the end of the spindle 13 facing the cutting tool head 17 is an annular shoulder 21 against which is press-fitted a sealing or retaining ring 22 having an L-shaped cross section. The ring 22 is rotatable with the spindle 13. Freely fitted within the ring 22 is a retaining ring 23. The ring 23 is secured to the stationary housing 11 by means of screws 24, of which one is illustrated.

The spindle 13 has a generally stepped configuration formed by portions having progressively increasing diameters with annular shoulders 25 and 31 therebetween and spaced apart from one another in a predetermined relationship. Seated on the shoulder 25 of the spindle 13 is an inner race 26 of a group of concentric thrust bearings 27 for journalling the spindle 13 in the bore 12 of the stationary housing 11. The inner race 26 is secured to the spindle 13 and rotates therewith, while an outer race 28 remains stationary and is secured to the housing 11. Balls 29 are rotatable between the inner race 26 and the outer race 28.

A second group of concentric thrust bearing assemblies 30 are seated on the shoulder 31 for further journalling the spindle 13 in the bore 12 of the stationary housing 11. An inner race 32 is seated on the shoulder 31. The inner race 32 is secured to the spindle 13 and rotates therewith. An outer race 33 remains stationary.

Confined between the stationary outer thrust race 28 of the thrust bearing 27 and the stationary housing 11 is a generally cylindrical thrust collar 34, which journals the rotatable spindle 13. A similar thrust collar 35 is seated on the outer thrust race 33 in a confined relationship with the thrust collar 34, and an outer sealing flange 36, as well as with the thrust collar 34. The thrust collars 34 and 35 are rigid non-compressible coupling members.

The thrust collars 34 and 35 are in extended surface contact with a resiliently deformable, non-compressible reactance member or ring 37, which is confined between the sealing flange 36, the housing 11 and the thrust collars 34 and 35. The reactance member 37 may be made of any suitable resilient material, such as an oil-resistant rubber substitute, or elastomer, like neoprene, which flows to take up any inaccuracies in machine dimensions or any change due to temperature variations, or the member may be a non-compressible fluid.

To apportion the load, each group of thrust bearings, such as 27 and 30, is provided with a thrust collar. Force is imparted from the thrust bearings 27 to the thrust collar 34 and further force is imparted from the thrust bearing 30 to the thrust collar 35. The thrust collar 34 and the thrust collar 35 contact a single reactance member, such as the neoprene ring 37, so that the total thrust load on the rotary member is exerted on the neoprene ring 37 through the medium of the thrust collars 34 and 35. The total thrust imposed on the reactance member 37 by the collars is the total thrust load imposed on the bearings 27 and 30 from the rotary member 13. The neoprene ring 37 transmits to the housing 11 the thrust load imposed thereon. The total force transmitted to the neoprene ring 37 by any collar is directly proportional to the contacting area of the collar in comparison with the total contacting area of all of the collars. Thus, the portion of the thrust load transmitted to the housing 11 through each of the bearings is dependent upon and directly proportional to contacting surface between the collar associated therewith and the reactance ring 37. Therefore, to equalize the thrust load for each bearing, the thrust collars must have equal cross sectional areas.

In the modified form, as shown in Figure 3, the cross sectional areas of the collar are not equal and therefore the thrust load for each thrust bearing is proportional to the respective cross sectional area of the collar associated therewith.

When assembling the spindle 13, all air or fluid is removed from the neoprene chamber through the hole 38. A plug 39 is fitted into the hole 38 to seal the same.

A coolant or lubricating fluid is fed to the spindle assembly through an inlet 40 and the coolant passes therefrom into a passageway 41 and then through an outlet 42.

To further journal the spindle 13 in the bore 12, bearings 43 are provided. Bearings 43 are primarily rotational bearings for rotation of the spindle 13 relative to the stationary housing 11. Springs 44 maintain the races of the bearings 43 in aligned relation. A sealing ring 45 is shown fitted around the decreased diameter portion of the spindle 13.

It will be understood that modifications and variations may be effected without departing from the scope of the novel concepts of the present invention.

I claim as my invention:

1. In a machine tool router assembly, a plurality of thrust bearings, a spindle for exerting a rotary thrust on said bearings, a plurality of coupling members, each of said coupling members having a surface contact with a respective one of said thrust bearings for transmitting a thrust load therefrom, a housing member for absorbing the thrust load, and a non-compressible, flowable reactance member having a predetermined surface contact area with each of said coupling members and said housing member through which the thrust load is transmitted from said coupling members to said housing member, whereby the thrust load for each of said bearings is proportional to the contact surface area of the coupling member associated therewith, said housing having a passage communicating with said reactance member from externally of the housing for removal of fluid adjacent to the reactance member, and means for closing said passage after removal of fluid.

2. In a thrust bearing assembly including a housing having a bore providing an inner shoulder, a shaft freely rotatable in said bore and having stepped annular shoulders facing said inner shoulder, and anti-friction bearings including inner and outer concentric radially aligned axially extending races, the inner races being seated in endwise abutment against said stepped shoulders, the improvement whereby the thrust loads on said bearings are equalized comprising a saddle having an end face seated against said inner shoulder and having in its opposite end face an annular groove, a noncompressible flowable reactance member of annular shape seated in said saddle groove, and concentric axially extending coupling members each being at one end in endwise abutment with one of the outer bearing races and at the other end being in endwise abutment with a portion of said reactance member for imparting a thrust load thereto.

ARTHUR W. BURKS.

REFERENCES CITED

The following references are of record in the file of this patent:

UNITED STATES PATENTS

| Number | Name | Date |
|---|---|---|
| 1,871,630 | Minor | Aug. 16, 1932 |
| 1,956,648 | Messinger | May 1, 1934 |
| 1,968,199 | Greve | July 31, 1934 |